(12) United States Patent
Dröge et al.

(10) Patent No.: US 11,783,156 B2
(45) Date of Patent: Oct. 10, 2023

(54) GLAZING WITH RFID TRANSPONDER

(71) Applicant: SAINT-GOBAIN GLASS FRANCE, Courbevoie (FR)

(72) Inventors: Alicia Dröge, Herzogenrath (DE);
Thomas Holtstiege, Schwelm (DE);
Christopher Marjan, Aachen (DE);
Christian Effertz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 74 days.

(21) Appl. No.: 17/626,355

(22) PCT Filed: Jul. 1, 2020

(86) PCT No.: PCT/EP2020/068488
§ 371 (c)(1),
(2) Date: Jan. 11, 2022

(87) PCT Pub. No.: WO2021/028110
PCT Pub. Date: Feb. 18, 2021

(65) Prior Publication Data
US 2022/0261612 A1  Aug. 18, 2022

(30) Foreign Application Priority Data
Aug. 9, 2019  (EP) .................................... 19190994

(51) Int. Cl.
*G06K 19/077* (2006.01)
*E06B 3/12* (2006.01)
*E06B 7/28* (2006.01)

(52) U.S. Cl.
CPC .......... *G06K 19/07758* (2013.01); *E06B 3/12* (2013.01); *E06B 7/28* (2013.01)

(58) Field of Classification Search
CPC ........ G06K 19/07758; E06B 3/12; E06B 7/28
(Continued)

(56) References Cited

U.S. PATENT DOCUMENTS

2016/0201381 A1  7/2016  Kuster et al.
2020/0193259 A1*  6/2020  Thangamani .... G06K 19/07749
(Continued)

FOREIGN PATENT DOCUMENTS

CN  103636060 A  3/2014
CN  108884700 A  11/2018
(Continued)

OTHER PUBLICATIONS

International Search Report as issued in International Patent Application No. PCT/EP2020/068488, dated Sep. 17, 2020.

*Primary Examiner* — Allyson N Trail
(74) *Attorney, Agent, or Firm* — Pillsbury Winthrop Shaw Pittman LLP

(57) ABSTRACT

A glazing for a façade glazing, window, door, or interior room divider, includes a frame having a metallic first frame element, a metallic second frame element, and a connecting polymeric third frame element surrounding the frame elements at least in some sections and preferably completely, and a glazing unit arranged in the frame, wherein at least one RFID transponder is arranged on one of the inner faces of the frame, a strip-shaped coupling element is electromagnetically coupled to the RFID transponder, and the coupling element is galvanically or capacitively coupled, in at least one coupling region, to one of the metallic frame elements and preferably, in two coupling regions, to, in each case, one of the metallic frame elements.

20 Claims, 6 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2020/0408031 | A1* | 12/2020 | Holtstiege ................ E06B 3/663 |
| 2021/0182648 | A1* | 6/2021 | Holtstiege .......... G06K 19/0723 |
| 2021/0230934 | A1* | 7/2021 | Holtstiege ............. E06B 3/5454 |
| 2022/0013881 | A1* | 1/2022 | Dröge ................ E06B 3/66309 |
| 2022/0025696 | A1* | 1/2022 | Dröge .................. H01Q 1/2283 |
| 2022/0094033 | A1* | 3/2022 | Thangamani .... G06K 19/07773 |
| 2023/0074877 | A1* | 3/2023 | Dröge ....................... E06B 3/66 |

FOREIGN PATENT DOCUMENTS

| | | |
|---|---|---|
| EP | 2 230 626 A1 | 9/2010 |
| JP | 2008-308402 A | 12/2008 |
| JP | 2014-121081 A | 6/2014 |
| WO | WO 00/36261 A1 | 6/2000 |
| WO | WO 2007/137719 A1 | 12/2007 |

\* cited by examiner

GLAZING WITH RFID TRANSPONDER

CROSS-REFERENCE TO RELATED APPLICATIONS

This application is the U.S. National Stage of PCT/EP2020/068488, filed Jul. 1, 2020, which in turn claims priority to European patent application number 19190994.4 filed Aug. 9 , 2019. The content of these applications are incorporated herein by reference in their entireties.

The invention relates to a glazing with a metallic frame and a glazing unit inserted into the frame, preferably an insulating glazing unit, wherein the frame engages the edges of the glazing unit and, at the same time, covers at least one RFID transponder. The RFID transponder can be used as an identification element. The glazing is in particular intended to form a façade glazing, a window, a door, or an interior room divider with a corresponding structure.

RFID transponders are used in a variety of ways for the identification of objects, for example, of solid or composite solid material panels, as is known, for example, from EP 2 230 626 A1.

Modern windows, doors, and façade glazings, at least for use in northern and temperate latitudes, are usually produced using prefabricated insulating glazing units (IGUs) that have the aforementioned structure, but, optionally, can include even more than two glass panes in the combination. Such insulating glazing units are mass-produced, shipped, and also independently marketed products that should be uniquely identifiable on their way to an end product and possibly even during maintenance and servicing.

It is already known to provide insulating glazing units with identifying markings, and certain requirements of manufacturers and users have arisen in the related practice:
  The identifying marking should not be visible either from the inside or from the outside of the finished window, door, or façade.
  The marking should be "readable" from a distance of at least 30 cm.
  The marking should be as forgery-proof as possible, i.e., should not be readily possible to overwrite or to copy.

The effectiveness of conventional identifying markings, such as barcodes or QR codes, is based on their visibility, which means at least one restriction under the first aspect above. Meeting the second requirement is also difficult. Protection against copying cannot be guaranteed since barcodes and QR codes can be photographed.

It has also been proposed to provide insulating glazing units with "electronic" identifiers, in particular identifiers readable via radio, so-called "RFID transponders". Such insulating glazing units are, for example, disclosed in WO 00/36261 A1 or WO 2007/137719 A1.

Such an RFID transponder can be protected with a password such that it cannot be overwritten or its radio capability destroyed without considerable effort.

Certain types of window and door frames, but especially façade constructions in which insulating glazing units are installed are made completely or at least partially of a metal (aluminum, steel . . . ), which interrupts or at least greatly attenuates the passage of radio waves from or to the RFID transponder on the insulating glazing unit. For this reason, meeting the second requirement above has, in particular, proved difficult. Known insulating glazing units provided with RFID transponders are, consequently, not readily usable with metal frame constructions. This reduces the potential range of application of glazing units identified in this manner and thus the acceptance of these marking solutions by manufacturers and users.

The object of the invention is, consequently, to provide an improved glazing having a glazing unit and a frame construction, wherein the frame construction is made, at least to a considerable extent, of a metal and also ensures meeting the aforementioned requirements in such installation situations.

This object is accomplished according to a first aspect of the invention by a glazing with the features of claim 1. Expedient further developments of the idea of the invention are the subject matter of the respective dependent claims.

The invention comprises a glazing, in particular a façade glazing, a window, a door, or an interior room divider, comprising:
  a frame consisting of a metallic first frame element, a metallic second frame element, and a connecting polymeric third frame element surrounding the frame elements at least in some sections and preferably completely, and
  a glazing unit according to the invention, in particular an insulating glazing unit, arranged in the frame,
wherein
  at least one RFID transponder is arranged on one of the inner faces of the frame,
  a strip-shaped coupling element is electromagnetically coupled to the RFID transponder, and
  the coupling element is galvanically or capacitively coupled, in at least one coupling region, to one of the metallic frame elements and preferably, in two coupling regions, to, in each case, one of the metallic frame elements.

The frame engages, preferably in the shape of a U, the end face of the glazing unit and, at the same time, covers the RFID transponder(s) in the through-vision direction through the glass pane. Usually, the legs of the first and second frame elements are designed such that they at least completely cover the outer region and the spacer frame in the through-vision direction through the glazing unit.

The invention includes the idea of taking into account the fundamentally unfavorable outgoing and incoming radiation conditions for radio waves in a metallic frame of a glazing by means of special coupling in and coupling out of the RFID signal. It further includes the idea of arranging a coupling element that is provided separately from the RFID transponder on the insulating glazing unit such that with suitable installation in a glazing, it couples optimally with its frame and effects signal transfer from the frame to the antenna of the RFID transponder or from the antenna of the RFID transponder to the frame and thus to the outside of the glazing.

The invention is a result of extensive experimental investigations undertaken on glazings with the aforementioned basic structure.

The glazing unit according to the invention advantageously consists of or includes a single pane, a composite pane, or a fire-resistant glazing unit, in particular with at least one intumescent layer.

The glazing unit according to the invention consists of or contains at least one and preferably exactly one insulating glazing unit, which comprises:
  at least one spacer, which is circumferentially formed into a spacer frame and delimits an inner region,
  a first glass pane that is arranged on a pane contact surface of the spacer frame and a second glass pane that is arranged on a second pane contact surface of the spacer frame, and the glass panes protrude beyond the spacer frame and form an outer region that is filled, at least in some sections, preferably completely, with a sealing element.

Advantageously, the RFID transponder has a dipole antenna and the coupling element is electromagnetically coupled to one antenna pole of the dipole antenna of the RFID transponder.

Here, the term "electromagnetically coupled" means that the coupling element and the RFID transponder are coupled by an electromagnetic field, i.e., are connected both capacitively and inductively and preferably not galvanically.

According to the invention, at least one RFID transponder is arranged on the frame in the inner region of the frame. In other words, the RFID transponder is arranged on an inside surface of the frame, preferably on an inside end face of the frame or an inside surface of the first or of the second frame element, which is arranged parallel to the large surfaces of the glazing unit.

With regard to the application situation, the inventors carried out, in particular, investigations on glazing units embedded in metallic frames, using the example of insulating glazing units, wherein the frame consists of two metal and thus electrically conductive frame elements that are connected via a polymeric and electrically insulating frame element. Such frames made of two metallic frame elements that are connected by a polymeric frame element are particularly advantageous since the polymeric frame element significantly reduces heat transfer from the first frame element to the second frame element and, thus, for example, from an exterior-space side to an interior-space side.

Elastomer profiles that seal the glazing and fix the glass panes are arranged between the outer sides of the glass panes and the inner sides of the adjacent metallic frame elements.

Commercially available UHF-RFID transponders, whose structure and functionality are well known and, consequently, need not be further described here, were used in the investigations.

In an advantageous embodiment of a glazing according to the invention, the RFID transponder is implemented as a dipole antenna. Such designs can be arranged particularly well in the elongated and strip-shaped outer region along the spacer and between the glass panes, on the end faces of the glass panes, or on the outer surfaces of the glass panes within the frame.

The dipole antenna includes or consists of at least one first antenna pole and one second antenna pole. Preferably, the antenna poles are arranged one behind the other in a line and thus parallel to one another. RFID electronics or a connection to RFID electronics is usually arranged in the center, between the antenna poles.

The coupling element according to the invention is arranged in some sections congruently above the RFID transponder. In this context, "in some sections congruently" means that the coupling element covers the dipole antenna in some sections in the orthogonal projection onto the RFID transponder.

If the RFID transponder is arranged, for example, on the inner side of the end face of the frame, the coupling element covers the RFID transponder and, in particular, one antenna pole of the dipole antenna of the RFID transponder, in some sections in the viewing direction perpendicular to the end face of the frame. It goes without saying that for optimal capacitive coupling of the coupling element to the RFID transponder and forwarding the RFID radio signal according to the invention, the coupling element is at least similar in size to the dipole antenna of the RFID transponder. In particular, the coupling element protrudes beyond the dipole antenna in the projection both on one side along the direction of extension of the dipole antenna and also transversely to the direction of extension. Here, the direction of extension of the dipole antenna is the longitudinal direction of the dipole antenna, i.e., along its antenna poles arranged linearly relative to one another and in the direction of its straight extension.

The radio wavelengths used in such RFID transponder systems are usually, depending on type, in the range of UHF at 865-869 MHz (including European frequencies) or 902-928 MHz (US and other frequency bands) or of SHF at 2.45 GHz and 5.8 GHz. The frequencies released for UHF-RFID transponders differ regionally for Asia, Europe, and America and are coordinated by the ITU.

Radio signals with these frequencies penetrate both wood and conventional plastics, but not metals. In particular, when the dipole antenna is arranged directly on a metal section of the frame, this can lead to a short-circuit of the dipole antenna and thus to undesirable impairment of the RFID transponder.

Consequently, in a preferred embodiment of the RFID transponder, the dipole antenna is arranged on a dielectric carrier element, particularly preferably a polymeric carrier element. The thickness of the carrier element is adapted to the material and, in particular, to the dielectric constant of the carrier element and to the geometry of the dipole.

It goes without saying that the dipole antennas together with electronics per se can be arranged on a dielectric carrier layer and, for example, a polymeric carrier layer, significantly simplifying assembly and prefabrication.

The findings of the inventors apply in principle to both passive and active RFID transponders.

With regard to the metal frame that engages around the glazing unit and that, based on elementary laws of physics and according to the knowledge of the person skilled in the art based thereon, should sensitively interfere with, if not completely suppress, the HF radiation of RFID transponders installed within the frame or their antennas, the proposed solution is surprising. It yields the unforeseen advantage that an RFID transponder placed according to the invention can still be read out at a relatively great distance of approx. 1.5 m from the glazing, in which the glazing according to the invention is installed.

It goes without saying that, by simple experiments, the person skilled in the art can find designs and positions with advantageous transmission and reception properties. The exemplary embodiments and aspects mentioned in the following are consequently primarily recommendations for the person skilled in the art, without restricting the implementation possibilities of the invention.

Thus, it goes without saying that a glazing can have a plurality of RFID transponders, in particular in the edge or outer regions of the various sides (top, bottom, right, left) of the glazing. This is usually necessary with prior art glazings with only short ranges of the RFID transponders in order to quickly find an RFID signal and quickly identify the glazing together with the glazing unit arranged therein. As a result of the increase according to the invention in the range of the RFID transponders, exactly one or few RFID transponders per insulating glazing usually suffice.

In an advantageous embodiment of the glazing according to the invention, the coupling element includes or consists of a self-supporting metal foil, preferably made of aluminum, an aluminum alloy, copper, silver, or stainless steel. Preferred metal foils have a thickness of 0.02 mm to 0.5 mm and in particular of 0.09 mm to 0.3 mm. Such coupling elements can be readily integrated into the glazing and are, moreover, simple and economical to produce. It goes without saying that the metal foil can also be stabilized by a polymer film or can be electrically insulated on one or both sides.

In an alternative advantageous embodiment of the glazing according to the invention, the coupling element includes or consists of a metallized polymer film with a preferred metallization of aluminum, an aluminum alloy, copper, silver, or stainless steel. Preferred metal layers have a thickness of 10 µm to 200 µm. Such coupling elements can also be readily integrated into the glazing and are, moreover, simple and economical to produce.

The coupling element according to the invention is advantageously arranged between the RFID transponder and at least one section of one of the frame elements.

In an advantageous embodiment, the coupling element is arranged directly on the frame elements and capacitively or galvanically connected to the metallic frame element.

In an alternative advantageous embodiment, an electrical insulation layer that galvanically separates the coupling elements from the metallic frame elements is arranged between the coupling element and the metallic frame elements in some sections. This is in particular advisable when the coupling element itself does not already have an electrically insulating carrier film or sheathing, in order to reduce the thermal coupling between the outer and inner sides. Such galvanic insulation prevents short-circuiting of the coupling element in undesirable areas, which can limit its functionality. The insulation layer is, for example, a polymer film or a paint film made of an electrically insulating material.

The coupling element according to the invention is advantageously arranged, at least in some sections, on the inside end face of the frame.

The coupling element protrudes, at least in the region of one of the metallic frame elements, beyond the inside end face transversely to the direction of extension. Here, the "direction of extension" of the frame means the direction of the long side of the frame as opposed to the short side of the frame, which is formed merely by the depth of the frame orthogonal to the surfaces of the glazing.

In an advantageous embodiment of a glazing according to the invention, the coupling element protrudes beyond the inside end face of the frame by a projection U. The coupling element is arranged in the region of the projection on the inside surface of the frame element that is parallel to the large surfaces of the glazing. The maximum projection depends on the width of the metallic frame element and in particular on the thickness of the elastomer profile, which is, for example, 6 mm to 7 mm.

The projection U is preferably from 2 mm to 30 mm, particularly preferably from 5 mm to 15 mm, and in particular from 7 mm to 10 mm.

The preferred length L of the coupling element, i.e., the length parallel to the direction of extension of the dipole antenna, depends on the operating frequency of the RFID transponder.

In another advantageous embodiment of a glazing according to the invention, the coupling element has a length L parallel to the dipole antenna greater than or equal to 40% of the half wavelength lambda/2 of the operating frequency of the dipole antenna, preferably from 40% to 240%, particularly preferably from 60% to 120%, and in particular from 70% to 95%.

For RFID transponders in the UHF range, in particular for RFID transponders at 865-869 MHz (including European frequencies) or 902-928 MHz (US and other frequency bands), particularly good results were obtained for coupling elements with a length L of more than 7 cm, preferably of more than 10 cm, and in particular of more than 14 cm. The maximum length was less critical. For example, maximum lengths of 30 cm still led to good results and good reading ranges.

In an alternative advantageous embodiment of a glazing according to the invention, the coupling element has a length L parallel to the dipole antenna from 7 cm to 40 cm, preferably from 10 cm to 20 cm, and in particular from 12 cm to 16 cm.

In an advantageous embodiment of a glazing according to the invention, the coupling element covers only one antenna pole of the dipole antenna and protrudes beyond the antenna pole on the side facing away from the other antenna pole. Here, "to cover" means that the coupling element is arranged in front of the respective antenna pole in the viewing direction toward the RFID transponder and covers it. Or, in other words, the coupling element covers the respective antenna pole in the orthogonal projection.

For example, the coupling element covers only the first antenna pole of the dipole antenna and extends beyond the first antenna pole on the side facing away from the second antenna pole. Alternatively, the coupling element covers only the second antenna pole of the dipole antenna and extends beyond the second antenna pole on the side facing away from the first antenna pole.

Advantageously, one edge of the coupling element is arranged above the center of the dipole antenna and extends over the first or the second antenna pole. As investigations by the inventors revealed, the coupling element can also have a small offset V between the edge of the coupling element and the center of the dipole antenna, wherein the offset V is measured in the projection of the coupling element onto the dipole antenna. The offset V thus means that the projection of the edge of the coupling element is not arranged exactly in the center between the antenna poles of the dipole antenna, but, instead, deviates by an offset V therefrom in the direction of extension of one antenna pole or in the direction of extension of the other antenna pole.

The respective maximum offset depends on the half wavelength lambda/2 of the operating frequency of the dipole antenna.

An offset of V=0 is optimal. However, good results and reading ranges were still achieved for deviations from this. Advantageously, the offset V is from −20% to +20% of the half wavelength lambda/2 of the operating frequency of the RFID transponder, preferably from −10% mm to +10%, and in particular from −5% to +5%.

In another advantageous embodiment of the invention, the offset V at an operating frequency of the RFID transponder in the UHF range is from −30 mm to +30 mm, preferably from −20 mm to +20 mm, and in particular from −10 mm to +10 mm. Here, a positive sign means, for example, that the edge of the coupling element is arranged in the projection on the second antenna pole and the remainder of the second antenna pole is completely covered; whereas, in contrast, the first antenna pole is completely uncovered. Conversely, a negative sign means that the edge of the coupling element is arranged in the projection on the first antenna pole, and a section of the first antenna pole as well as the remainder of the second antenna pole is completely covered.

The width of the coupling element advantageously depends on the width of the frame and, optionally, on the respective projection beyond the inside end face of the frame on one side or both sides. Typical widths are from 2 cm to 10 cm and preferably from 3 cm to 5 cm.

The specific dimensioning will be carried out by the person skilled in the art under consideration of the dimensions of the glazing, on the one hand, and of the surrounding frame, on the other, in particular taking into account the width of the frame.

The coupling element according to the invention is galvanically or capacitively coupled in at least one coupling region with one of the metallic frame elements and preferably in two coupling regions with one of the metallic frame elements in each case. The coupling element is preferably in direct contact with the metallic frame element and is galvanically connected thereto, for example. Preferably, the coupling element contacts the metallic frame element over its entire length.

The coupling element does not have to be fixedly anchored to the metallic frame element. Instead, even loose contact or clamping is sufficient. In particular, capacitive coupling between the coupling element and the metallic frame element in the coupling region suffices.

There are various options for the placement of the RFID transponder in the glazing from which the person skilled in the art can select a suitable one, taking into account the specific mounting technology and also with respect to the specific façade or window construction It goes without saying that multiple RFID transponders can also be arranged at positions different from those mentioned above.

In another advantageous glazing according to the invention, the RFID transponder is arranged on the polymeric third frame element, and
 a first strip-shaped coupling element is arranged between the first antenna pole of the dipole antenna and the third frame element, which is capacitively or galvanically coupled to the first frame element, and
 a second strip-shaped coupling element is arranged between the second antenna pole of the dipole antenna and the third frame element, which is capacitively or galvanically coupled to the second frame element.

For this purpose, the first coupling element extends only to a section of the first frame element and not to the second frame element. Furthermore, the second coupling element extends only to a section of the second frame element and not to the first frame element.

Advantages and functionalities of the invention are also evident from the following description of exemplary embodiments and aspects of the invention with reference to the figures. The drawings are purely schematic representations and not to scale.

They in no way restrict the invention. They depict:

FIG. 1A a detailed view (cross-sectional representation) of an edge region of a glazing with an insulating glazing unit in accordance with an embodiment of the invention, FIG. 1B a detailed view (plan view) of a detail of the glazing with an insulating glazing unit of FIG. 1A, FIG. 1C a detailed view (cross-sectional representation) of the glazing in a sectional plane parallel to the end face of the insulating glazing unit of FIG. 1A, FIG. 2A a detailed view (cross-sectional representation) of an edge region of a glazing with an insulating glazing unit in accordance with another embodiment of the invention, FIG. 2B a detailed view (cross-sectional representation) of the glazing in a sectional plane parallel to the end face of the insulating glazing unit of FIG. 2A, and FIG. 3 a detailed view (cross-sectional representation) of a glazing in a sectional plane parallel to the end face of the insulating glazing unit in accordance with another embodiment.

In the figures as well as the following description, the glazing units as well as the glazings and the individual components are in each case identified with the same or similar reference numbers regardless of the fact that the specific embodiments differ.

FIG. 1A depicts a detailed view (cross-sectional representation) of an edge region of a glazing 2 according to the invention with an insulating glazing unit 1.

It goes without saying that the glazing 2 can also have one or a plurality of glazing units comprising a single pane, a composite pane, or a fire-resistant glazing unit, in particular with an intumescent layer. All embodiments shown here apply in isolation and in combination to all types of glazing units.

FIG. 1B depicts a detailed view (plan view) of a detail of the glazing 2 with an insulating glazing unit 1 of FIG. 1A with a viewing direction in accordance with the arrow A of FIG. 1A.

FIG. 1C depicts a detailed view (cross-sectional representation) of the glazing 2 in a sectional plane parallel to the end face 14 of the insulating glazing unit 1 of FIG. 1A with a viewing direction along the arrow B of FIG. 1A.

The insulating glazing unit 1 comprises, in this embodiment, two glass panes 4a and 4b. These are held at a predetermined distance by a spacer 5 placed between the glass panes 4a, 4b near the end face 14 of the insulating glazing unit 1. The main body of the spacer 5 is made, for example, of glass-fiber-reinforced styrene acrylonitrile (SAN).

FIG. 1B depicts a schematic plan view of the insulating glazing unit 1 in a viewing direction indicated by the arrow A. FIG. 1B therefore depicts the second glass pane 4b lying on top.

Multiple spacers 5 (here, for example, four) are routed along the side edges of the glass panes 4a, 4b and form a spacer frame 5'. The pane contact surfaces 5.1, 5.2 of the spacers 5, i.e., the contact surfaces of the spacers 5 with the glass panes 4a, 4b, are bonded in each case to the glass panes 4a or 4b and thus mechanically fixed and sealed. The adhesive bond is made, for example, of polyisobutylene or butyl rubber. The inner surface 5.4 of the spacer frame 5' delimits, together with the glass panes 4a, 4b, an inner region 12.

The spacer 5 is usually hollow (not shown) and filled with a desiccant (not shown), which binds, via small interior-side openings (likewise not shown), any moisture that has penetrated into the inner region 12. The desiccant contains, for example, molecular sieves such as natural and/or synthetic zeolites. The inner region 12 between the glass panes 4a and 4b is filled, for example, with a noble gas, such as argon.

The glass panes 4a, 4b usually protrude beyond the spacer frame 5' on all sides such that the outer surface 5.3 of the spacer 5 and the outer sections of the glass panes 4a, 4b form an outer region 13. A sealing element (sealing profile) 6 is introduced into this outer region 13 of the insulating glazing unit 1 between the glass panes 4a and 4b and outside the spacer 5. This is shown here in simplified form as a single piece. In practice, it usually comprises two components, one of which seals the contact surface between the spacer 5 and the glass panes 4a, 4b and protects against penetrating moisture and external influences. The second component of the sealing element 6 additionally seals and mechanically stabilizes the insulating glazing unit 1. The sealing element 6 is, for example, formed from an organic polysulfide.

An insulation film (not shown here), which reduces the heat transfer through the polymeric spacer 5 into the inner region 12, is applied, for example, on the outer surface of the spacer 5, i.e., on the side of the spacer 5 facing the outer region 13. The insulation film can, for example, be attached to the polymeric spacer 5 with a polyurethane hot-melt adhesive. The insulation film includes, for example, three polymeric layers of polyethylene terephthalate with a thickness of 12 µm and three metallic layers made of aluminum with a thickness of 50 nm. The metallic layers and the polymeric layers are attached alternatingly in each case, with the two outer plies formed by polymeric layers. In other words, the layer sequence consists of a polymeric layer, followed by a metallic layer, followed by an adhesive layer, followed by a polymeric layer, followed by a metallic layer, followed by an adhesive layer, followed by a metallic layer, followed by a polymeric layer.

As already mentioned, the main body of the spacer 5 is made, for example, of glass-fiber-reinforced styrene acrylonitrile (SAN). By means of the selection of the glass fiber content in the spacer main body, its coefficient of thermal expansion can be varied and adjusted. By adjusting the coefficient of thermal expansion of the spacer main body and of the insulation film, temperature-induced stresses between the different materials and flaking of the insulation film can be avoided. The spacer main body has, for example, a glass fiber content of 35%. The glass fiber content in the spacer main body simultaneously improves strength and stability.

The first glass pane 4a and the second glass pane 4b are made, for example, of soda lime glass with a thickness of 3 mm and have, for example, dimensions of 1000 mm×1200 mm. It goes without saying that each insulating glazing unit 1 depicted in this and the following exemplary embodiments can also have three or more glass panes.

The glazing 2 further comprises a frame 3 that is, for example, U-shaped. In this example, the frame 3 comprises a first metallic frame element 3.1 that is connected to a second metallic frame element 3.2 via a polymeric, electrically insulating third frame element 3.3. In this example, the first and second frame elements 3.1, 3.2 are L-shaped. Consequently, the frame 3 engages the end face 14 of the insulating glazing unit 1 in the shape of a U. The sections of the first and second frame elements extending parallel to the large surfaces of the glass panes 4a, 4b are implemented such that they completely cover at least the outer region 13 with the sealing element 6 and the spacer frame 5' in the through-vision direction (arrow A) through the insulating glazing unit 1.

The insulating glazing unit 1 is arranged on carriers (not shown here), in particular on plastic carriers or carrier elements electrically insulated by plastics. Furthermore, an elastomer profile 7 is arranged in each case between the metallic frame elements 3.1, 3.2 and the glass panes 4a, 4b such that the insulating glazing unit 1 is firmly held within the frame 3. The elastomer profile 7 has, for example, a thickness of 6.5 mm and fixes the distance between the respective frame elements 3.1, 3.2 and the glass panes 4a, 4b.

The glazing of FIG. 1A to 1C is, by way of example, provided with an RFID transponder 9 that is arranged on the second frame element 3.2. The RFID transponder 9 is arranged within the frame 3 and there on the inner surface of the second frame element 3.2, which runs parallel to the large surfaces of the glass panes 4a and 4b. It goes without saying that the RFID transponder 9 can also be arranged at other positions within the frame 3, for example, at one of the inner end faces of the frame elements 3.1, 3.2, 3.3 or at the inner face of the first frame element 3.1, which extends parallel to the large surfaces of the glass panes 4a and 4b. In this case, the arrangement of the RFID transponder 9 on one of the metallic frame elements 3.1, 3.2 is preferable due to better signal coupling and decoupling.

The operating frequency of the RFID transponder is in the UHF range and is, for example, around 866.6 MHz.

Furthermore, arranged on the end face 14 of the insulating glazing unit 1 is a coupling element 10, consisting, for example, of a 0.1-mm-thick electrically conductive foil, and is made, for example, of an aluminum foil. Here, the coupling element 10 extends, for example, from the inner end face 14 of the first frame element 3.1 over the inner end face 14 of the second frame element 3.3, and over the inner end face 14 of the third frame element 3.2.

Here, the coupling element 10 can be arranged directly on the frame elements 3.1,3.2,3.3 (not shown in the figures here). This configuration is particularly simple and economical to produce.

Alternatively, an insulation layer 8 made, for example, of a polymeric film is arranged between the coupling element 10 and the respective sections of the frame elements 3.1, 3.2,3.3 consisting, for example, of a polymeric film. The polymeric film consists, for example, of a 0.16-mm-thick polyimide film. It goes without saying that the insulation layer 8 can also be part of an electrically insulating coating on one or both sides of the coupling element 10. Moreover, the coupling element 10 is guided around the inner corner of the second frame element 3.2 on the inside relative to the frame 3 and formed in a region 10.1 of the coupling element 10 along the inner surface of the second frame element 3.2, which runs parallel to the large surfaces of the glass panes 4a and 4b. The coupling element 10 is arranged in this region 10.1 between the RFID transponder 9 and the second frame element 3.2. Moreover, the coupling element 10 is electromagnetically coupled to the RFID transponder 10 in this region 10.1. Additionally, the coupling element 10 is, for example, galvanically coupled to the second frame element 3.2 in this region 10.1. It goes without saying that, in this region 10.1, the coupling element 10 can also only be coupled electromagnetically to the second frame element 3.2, for example, via an insulation film and, in particular, via a continuation of the insulation film 8. The region 10.1 is also referred to in the following as "one-sided projection 10.1". The width U of the projection 10.1 is, for example, 9 mm.

One edge of the coupling element 10 is arranged roughly congruently over one of the two antenna poles of the dipole antenna 9.1. In other words, the edge of the coupling element 10 is arranged essentially in the center of the dipole antenna 9.1. Here, "congruently arranged" means that the coupling element 10 is arranged within the orthogonal projection of the antenna pole of the dipole antenna 9.1 on the coupling element 10 and at least completely covers it. In other words, the coupling element 10 is arranged, with respect to a plan view, on the RFID transponder 9 and completely covers one antenna pole of the dipole antenna 9.1.

The length L of the coupling element 10 in its direction of extension parallel to the direction of extension of the dipole antenna 9.1 and thus parallel to the direction of extension of the long side of the frame 3, is, for example, 15 cm. Thus, the coupling element 10 is roughly as long as the dipole antenna 9.1 and thus protrudes beyond its end by approx. 50% on one side.

In the example shown, the RFID transponder 9 is one in which the dipole antenna 9.1 is arranged on a dielectric carrier body 9.2. This is necessary, since both the coupling element 10 and the second frame element 3.2 are electrically conductive. Without the dielectric carrier body 9.2, the dipole antenna 9.1 would be arranged directly on an electrically conductive surface and thus "short-circuited". Through the use of an RFID transponder 9 with a dielectric carrier body 9.2 (a so-called "on-metal" RFID transponder), the short-circuit can be avoided.

In the example here, half of the RFID transponder 9 is glued or clamped on the coupling element 10 above the metallic frame elements 3.2, and the other half is glued or clamped to the frame element 3.2 itself.

As shown in FIG. 1C, the dipole antenna 9.1 consists of a first antenna pole 9.1.1 and a second antenna pole 9.1.2, both of which are connected, in the center of the RFID transponder 9, to electronics. The coupling element 10 is arranged such that it completely covers the first antenna pole 9.1.1 and protrudes beyond the first antenna pole 9.1.1 on the side facing away from the second antenna pole 9.1.2. Electromagnetic coupling occurs as a result of this covering and the small distance between the first antenna pole 9.1.1 and the coupling element 10.

As shown in detail in FIGS. 1A and 1C, the coupling element 10 is coupled to the metallic second frame 3.2 in a coupling region 15. For this purpose, the conductive foil of the coupling element 10 rests, for example, over its entire length, against the second frame element 3.2 and is galvanically connected thereto. It goes without saying that a capacitive coupling is also sufficient for coupling high-frequency signals in the operating range of the RFID transponder 9.

As investigations by the inventors surprisingly revealed, by coupling the coupling element 10 to the frame 3 of the glazing 2, the signal of the dipole antenna 9.1 of the RFID transponder 9 can be conducted to the outside; and, conversely, a signal can be supplied to the RFID transponder 9 from the outside. Surprisingly, the range of the RFID signal is significantly increased compared to glazings 2 with insulating glazing units 1 without a coupling element 10.

Thus, with an RFID readout device, it was possible to read out signals at a distance of up to 1.5 m and to send signals to the RFID transponder 9—in particular on the side of the insulating glazing unit 1 on which the second, coupled, metallic frame element 3.2 is arranged.

Figure 1A:
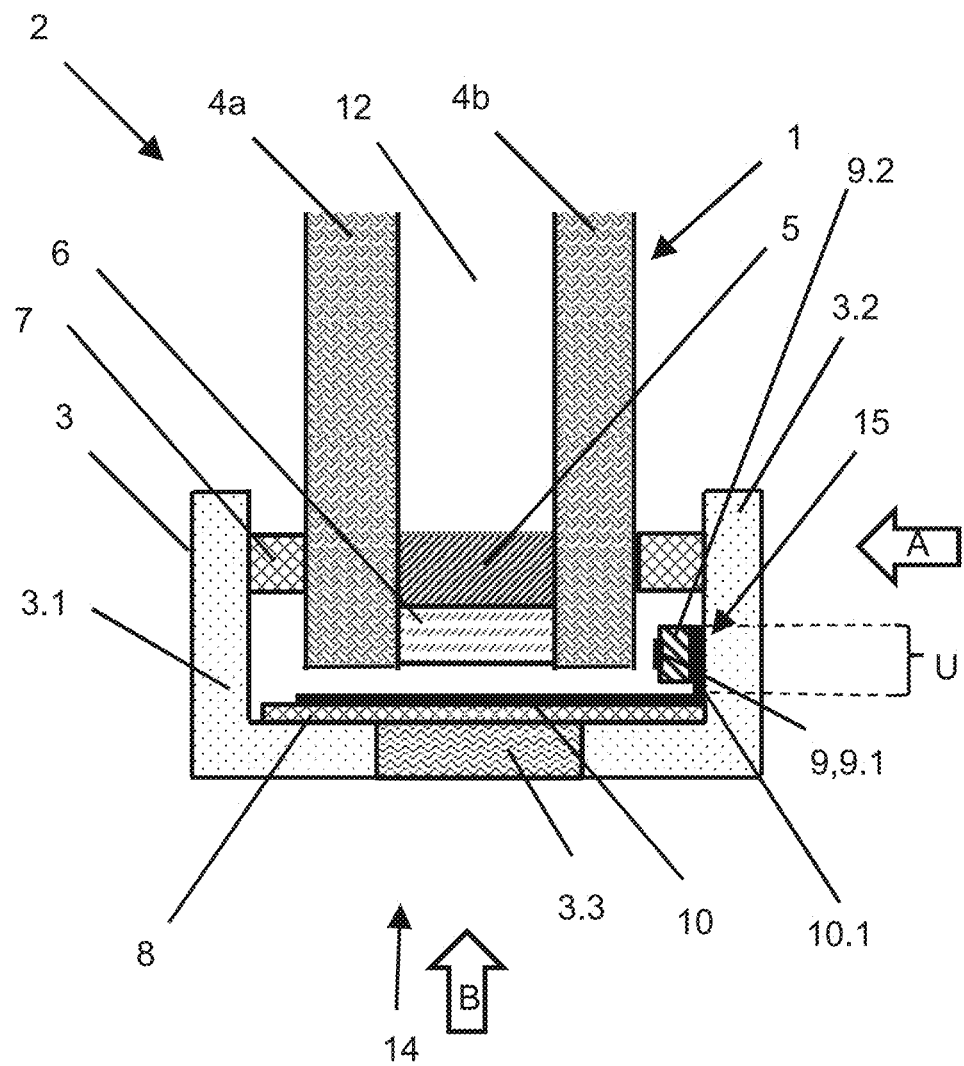
Figure 1B:
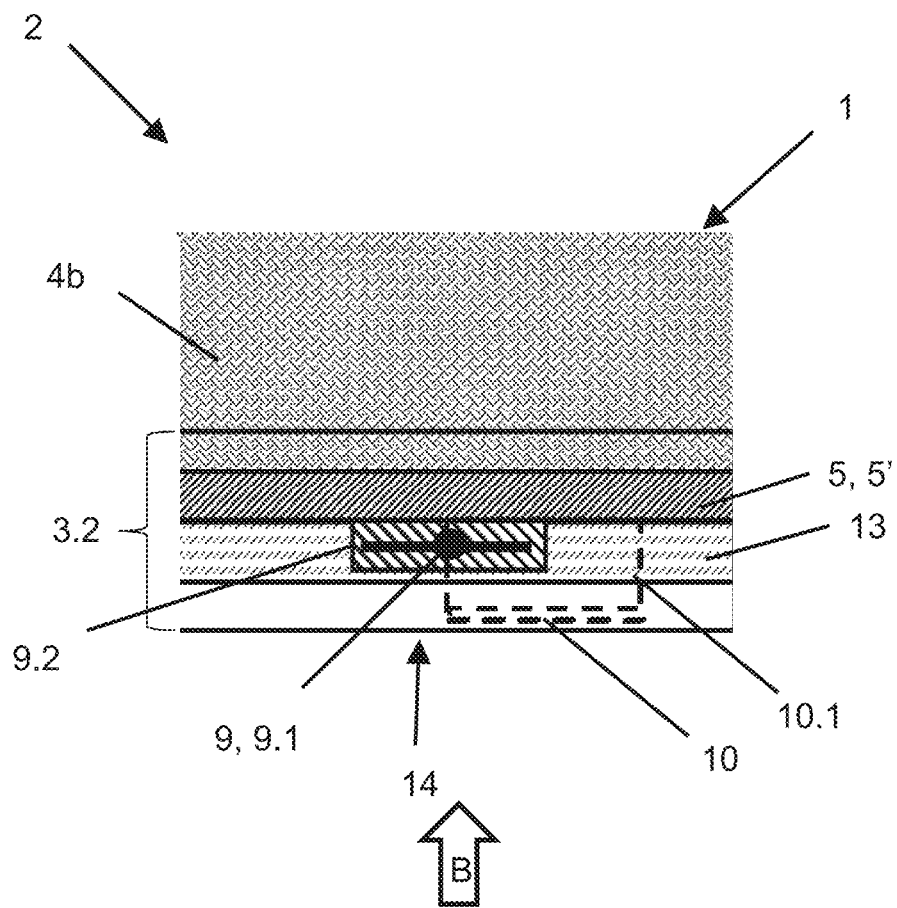
Figure 1C:
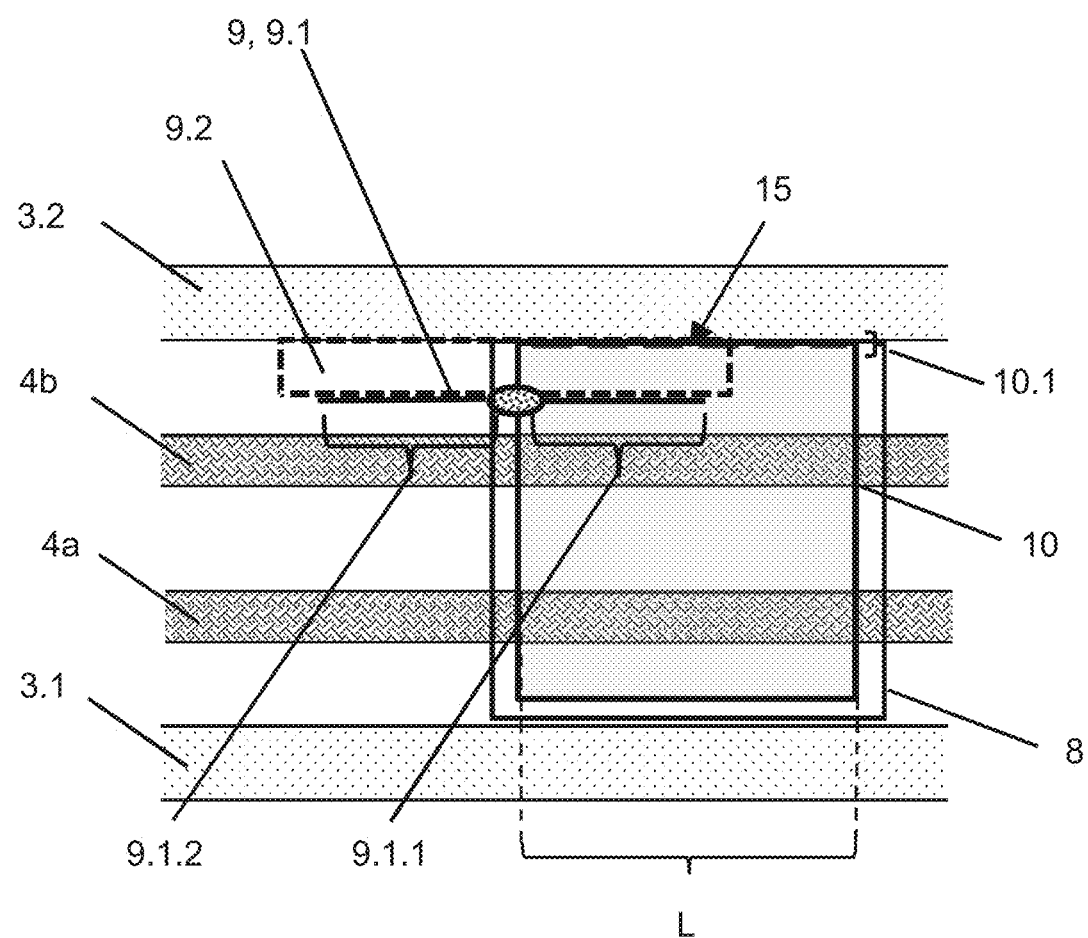
Figure 2A:
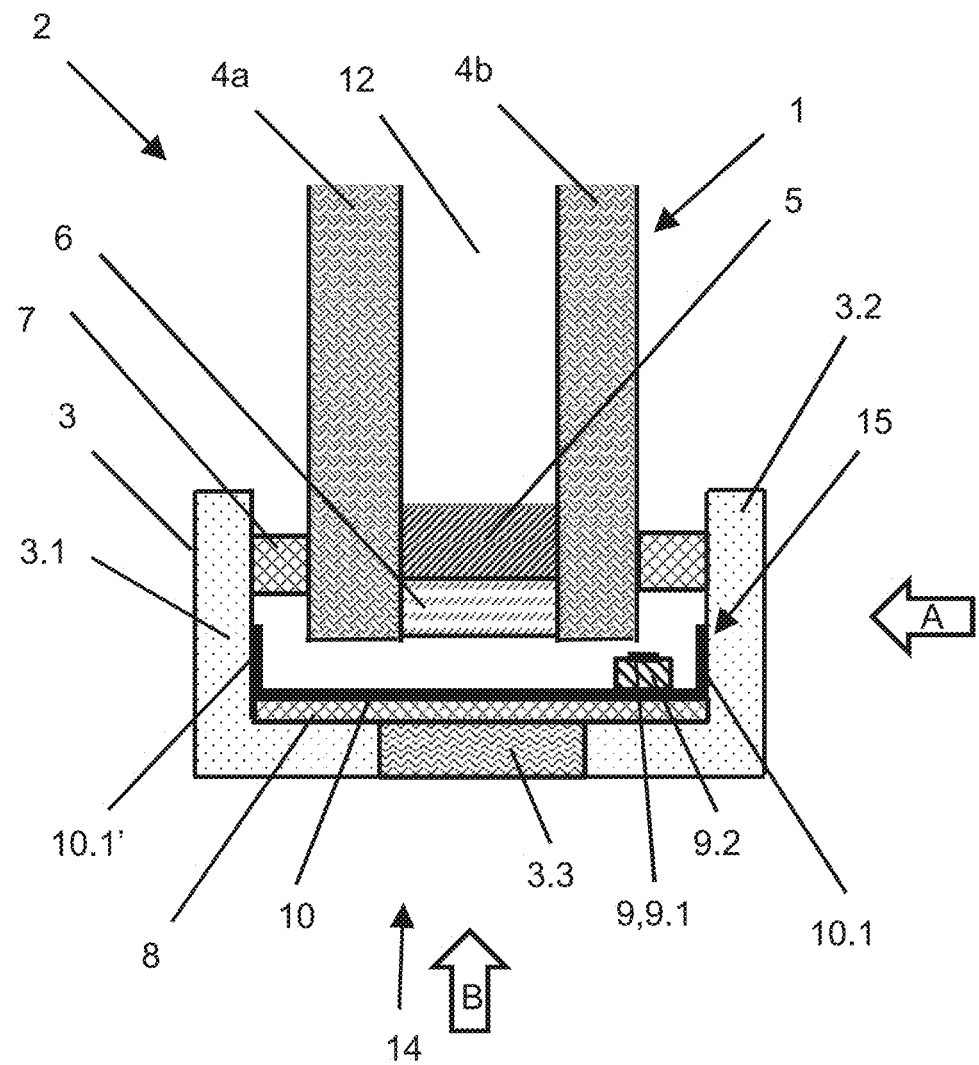
FIG. 2A depicts a detailed view (cross-sectional representation) of an edge region of a glazing 2 with an insulating glazing unit 1 in accordance with another embodiment of the invention.
Figure 2B:
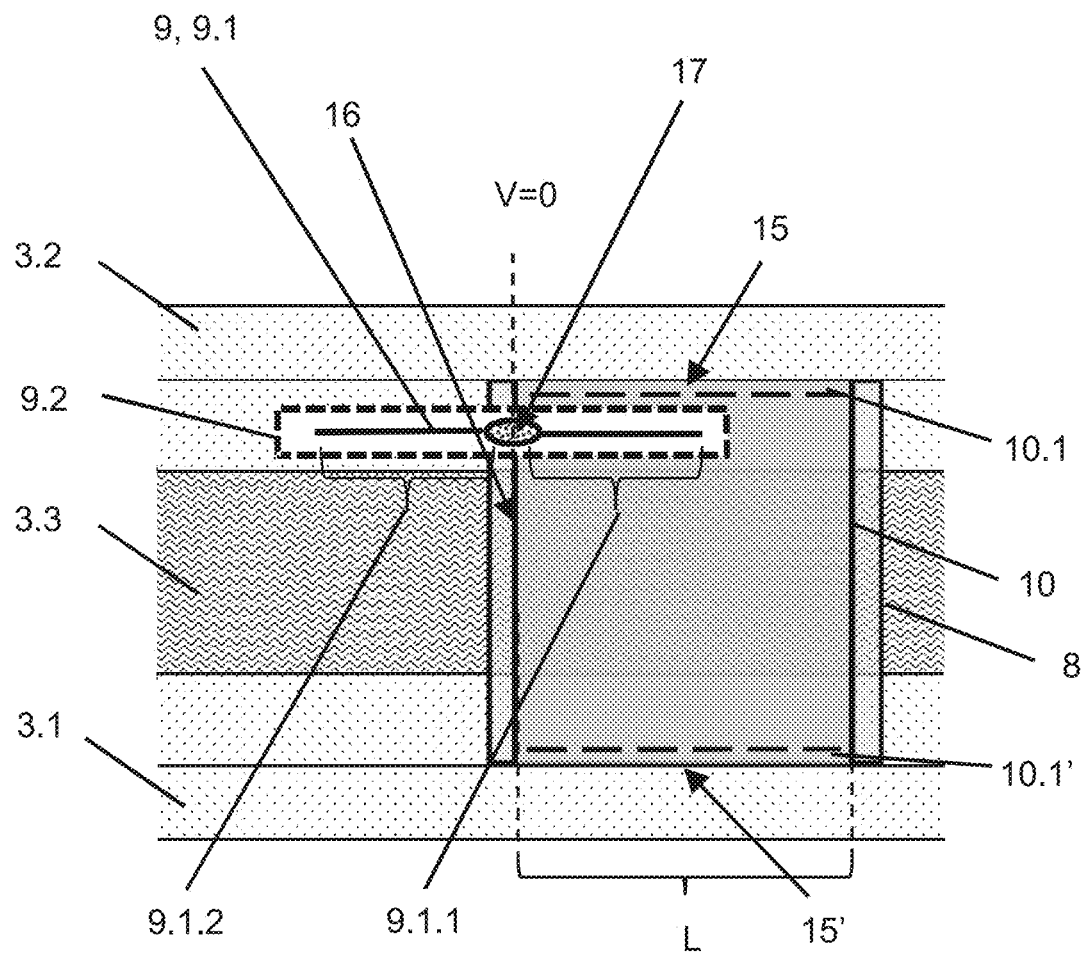
FIG. 2B depicts a detailed view (cross-sectional representation) of the glazing in a sectional plane parallel to the end face 14 of the glazing 2 of FIG. 3A in the viewing direction of the arrow B of FIG. 2A.

FIGS. 2A and 2B depict a modified design that has largely the elements and the structure of the glazing 2 with an insulating glazing unit 1 of FIG. 1A-C. Thus, the same reference numbers are used as there and the structure is not described again here. The viewing direction in FIG. 2B points from the side of the insulating glazing unit 1 into the frame 3, i.e., counter to the direction of the arrow B of FIG. 2A.

The insulating glazing unit 1 of FIGS. 2A and 2B differs from FIGS. 1A and 1C in the design of the coupling element 10, which has, here, a projection 10.1, 10.1' on both sides beyond the inside end face of the frame 2. This results in two coupling regions 15, 15', in which the coupling element 10 couples to the first and second frame elements 3.1, 3.2. Overall, this leads to symmetrization of the above-described properties for improving readout ranges of the RFID signal such that the same signal strengths can be achieved on both sides of the glazing 2.

Furthermore, here, the RFID transponder 9 is arranged, for example, relative to the frame 3 and with the interposition of the coupling element 10 and the insulation layer 8, on the inner end face of the second frame element 3.2. It goes without saying that it can also be arranged on the inner end face of the first frame element 3.1 or the frame element 3.3.

Table 1 shows measurement results on a glazing 2 according to the invention with an insulating glazing unit 1 in accordance with FIGS. 2A and 2B compared to a comparative example. The Comparative Example is a glazing not according to the invention with an RFID transponder 9 in accordance with FIG. 1A-C, but without a coupling element 10 according to the invention.

TABLE 1

| | Typical maximum reading range with RFID handheld reader |
|---|---|
| Comparative Example (glazing with RFID transponder without coupling element) | 0.3 m-0.5 m |
| Glazing with an insulating glazing unit of FIG. 2A and 2B | 1.0 m-1.5 m |

For the comparative measurements, the RFID transponder 9 was read out with a handheld RFID reader and the reader was arranged at increasing distance from the RFID transponder 9. The distance was measured with a laser rangefinder. The maximum reading range was independent of the side on which measurements were made relative to the insulating glazing.

In the Comparative Example of an RFID transponder 9, which was arranged in the outer region 13 of a prior art glazing (without a coupling element), a maximum reading range of 0.5 m resulted. The range of 0.3 m to 0.5 m reported in Table 1 was obtained from different angles at which the reader was held relative to the glazing. The reading range can be further reduced by different façade geometries. Such a short range is insufficient for practical use, since in the case of an unknown position of the RFID transponder in the glazing, the entire frame must be searched.

In contrast, in the case of an insulating glazing unit 1 with a coupling element 10 that is arranged in the frame 3 of a glazing 2 according to the invention, there were surprisingly ranges of up to 1.5 m. This is completely sufficient for practical use and corresponds to roughly half the distance values that an RFID transponder 9 has according to specification.

Figure 3:
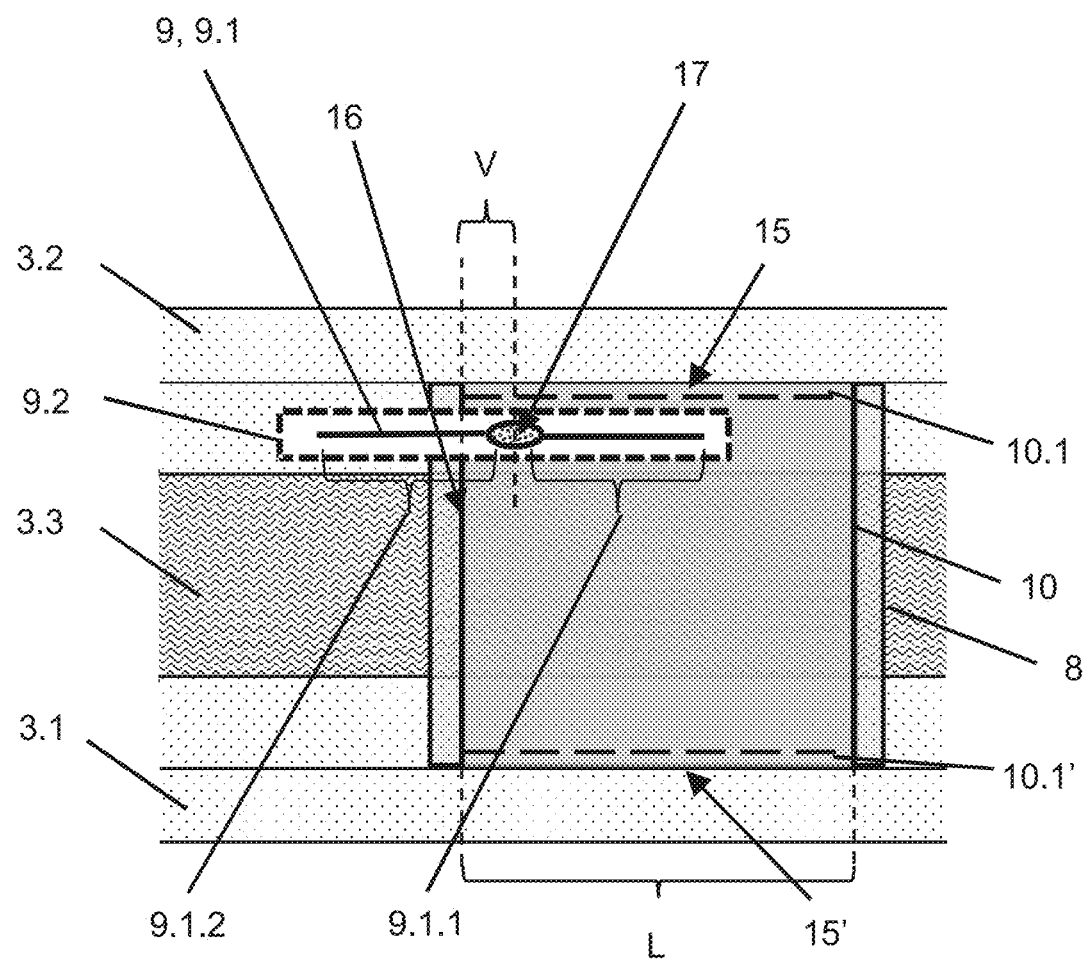

FIG. 3 depicts a detailed view (cross-sectional representation) of a glazing 2 in a sectional plane parallel to the end face 14 according to another embodiment of the invention. Here, the viewing direction is from the side of the insulating glazing unit 1 into the frame 3, i.e., counter to the direction of the arrow B of FIG. 2A.

Here, one edge 16 of the coupling element 10 is not arranged centrally relative to the dipole antenna 9.1 (center of the dipole 17), but is shifted by an offset V of roughly 10 mm. The coupling element 10 thus also covers part of the second antenna pole 9.1.2. Nevertheless, good RFID signals were measured here. Overall, up to an offset V of 20% of the half wavelength lambda/2 of the operating frequency of the RFID transponder 9, good and practically utilizable signals or sufficiently large maximum reading ranges can be obtained. It is irrelevant whether the offset V is in the direction of the first antenna pole 9.1.1 or in the direction of the second antenna pole 9.1.2. Investigations by the inventors revealed that such an arrangement also positively affects the reception/transmission characteristics and increases the achievable readout distance of the RFID transponder 9.

The implementation of the invention is not restricted to the above-described examples and highlighted aspects of the embodiments, but is also possible in a large number of modifications that are evident to the person skilled in the art from the dependent claims.

LIST OF REFERENCE CHARACTERS 1 insulating glazing unit
2 glazing, insulating glazing
3 frame
3.1, 3.2 metallic, first or second frame element
3.3 polymeric, third frame element
4a, 4b glass panes
5 spacer
5' spacer frame
5.1, 5.2 pane contact surface
5.4 inner surface of the spacer 5
6 sealing element
7 elastomer profile
8 insulation layer
9 RFID transponder
9.1 dipole antenna
9.1.1, 9.1.2 first or second antenna pole
9.2 dielectric carrier element
10 coupling element
10' region of the coupling element 10
10.1, 10.1' projection
12 inner region
13 outer region
13.1 outer side of the outer region 13
14 end face of the insulating glazing unit 1 or of the glass panes 4a, 4b
15 coupling region
16 edge of the coupling element 10
17 center of the dipole antenna 9.1
18 outer surface of the glass pane 4a or 4b
19 inner surface of the glass pane 4a or 4b
arrow A plan view direction or through-vision direction
arrow B plan view direction
A distance
L length
Lambda wavelength
U projection
V offset

The invention claimed is:

1. Glazing, comprising:
a frame consisting of a metallic first frame element, a metallic second frame element, and a connecting polymeric third frame element surrounding the metallic first and second frame elements at least in some sections, and
a glazing unit arranged in the frame,
wherein
at least one RFID transponder is arranged on an inner face of the frame,
a strip-shaped coupling element is electromagnetically coupled to the RFID transponder, and
the strip-shaped coupling element is galvanically or capacitively coupled, in at least one coupling region, to one of the metallic first and second frame elements.

2. The glazing according to claim 1, wherein the frame engages end faces of the glazing unit and, at the same time, covers the RFID transponder in a through-vision direction through glass panes of the glazing unit.

3. The glazing according to claim 1, wherein the glazing unit comprises or consists of a single pane, a composite pane, a fire-resistant glazing unit, or an insulating glazing unit, and the insulating glazing unit comprises
at least one spacer, which is circumferentially formed into a spacer frame and delimits an inner region,
a first glass pane, which is arranged on a pane contact surface of the spacer frame, and a second glass pane, which is arranged on a second pane contact surface of the spacer frame, and
the first and second glass panes protrude beyond the spacer frame, and an outer region is formed, which is filled at least in some sections with a sealing element.

4. The glazing according to claim 1, wherein the strip-shaped coupling element contains or consists of a metallized polymer film or a self-supporting metal foil.

5. The glazing according to claim 4, wherein the metallization of the metallized polymer film has a thickness of 10 μm to 200 μm and the self-supporting metal foil has a thickness of 0.02 mm to 0.5 mm.

6. The glazing according to claim 1, wherein the strip-shaped coupling element protrudes beyond an inside end face of the frame in some sections.

7. The glazing according to claim 1, wherein an electrical insulation layer, which galvanically separates the strip-shaped coupling element from the metallic first and second frame elements, is arranged between the strip-shaped coupling element and the metallic first and second frame elements.

8. The glazing according to claim 1, wherein the RFID transponder is arranged on an inside surface of the frame on an inside end face of the frame or an inside surface of the metallic first or second frame element that is arranged parallel to large surfaces of the glazing unit.

9. The glazing according to claim 1, wherein the strip-shaped coupling element is arranged between the RFID transponder and at least one section of one of the first, second and third frame elements.

10. The glazing according to claim 1, wherein the strip-shaped coupling element is arranged congruently above the RFID transponder in some sections.

11. The glazing according to claim 1, wherein the RFID transponder contains or consists of a dipole antenna with a first antenna pole and a second antenna pole.

12. The glazing according to claim 11, wherein the strip-shaped coupling element exactly covers one of the first and second antenna poles and protrudes beyond said one of the first and second antenna poles on a side facing away from the other one of the first and second antenna poles.

13. The glazing according to claim 11, wherein one edge of the strip-shaped coupling element has, in the projection, an offset V from a center of the dipole antenna of −20% to +20% of the half wavelength lambda/2 of an operating frequency of the RFID transponder.

14. The glazing according to claim 11, wherein one edge of the strip-shaped coupling element has, in the projection, an offset V from a center of the dipole antenna at an operating frequency of the RFID transponder in the UHF range of −30 mm to +30 mm.

15. The glazing according to claim 1, wherein the strip-shaped coupling element has a length L parallel to a direction of extension of the dipole antenna greater than or equal to 40% of the half wavelength lambda/2 of an operating frequency of the dipole antenna.

16. The glazing according to claim 1, wherein the strip-shaped coupling element has a length L parallel to a direction of extension of the dipole antenna greater than or equal to 7 cm.

17. The glazing according to claim 11, wherein the RFID transponder is arranged on the polymeric third frame element and
- a first strip-shaped coupling element is arranged between the first antenna pole of the dipole antenna and the polymeric third frame element, which is galvanically or capacitively coupled to the metallic first frame element, and
- a second strip-shaped coupling element is arranged between the second antenna pole of the dipole antenna and the polymeric third frame element, which is galvanically or capacitively coupled to the second frame element, and wherein
- the first strip-shaped coupling element extends to a section of the metallic first frame element and not to the metallic second frame element, and
- the second strip-shaped coupling element extends to a section of the metallic second frame element and not to the metallic first frame element.

18. A method comprising identifying a glazing according to claim 1 with the RFID transponder.

19. The glazing according to claim 1, wherein the connecting polymeric third frame element completely surrounds the metallic first and second frame elements.

20. The glazing according to claim 1, wherein the strip-shaped coupling element is galvanically or capacitively coupled in two coupling regions to a respective one of the metallic first and second frame elements.

* * * * *